M. F. HUXLEY.
SAFETY BELT FOR AVIATORS AND OTHERS.
APPLICATION FILED DEC. 8, 1917.

1,275,034.

Patented Aug. 6, 1918.
2 SHEETS—SHEET 1.

INVENTOR
M. F. Huxley.

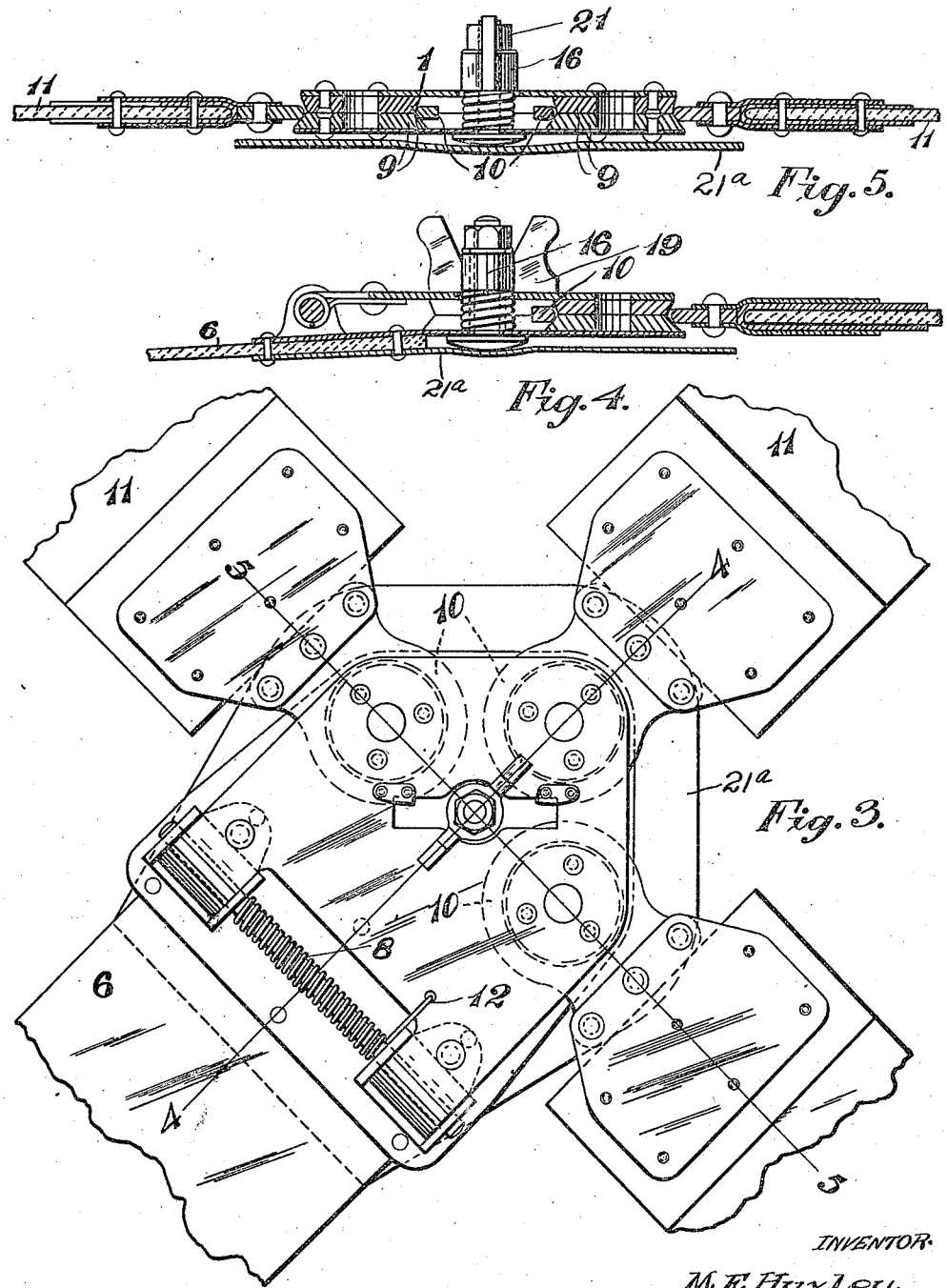

UNITED STATES PATENT OFFICE.

MAURICE FRANCIS HUXLEY, OF HENDON, LONDON, ENGLAND.

SAFETY-BELT FOR AVIATORS AND OTHERS.

1,275,034. Specification of Letters Patent. Patented Aug. 6, 1918.

Application filed December 8, 1917. Serial No. 206,305.

*To all whom it may concern:*

Be it known that I, MAURICE FRANCIS HUXLEY, a subject of the King of Great Britain, residing at Fairview, Colindale avenue, Hendon, London, England, have invented certain new and useful Improvements in Safety-Belts for Aviators and Others, of which the following is a specification.

This invention relates to safety belts for aviators and others. Many attempts have been made to provide a belt for aviators which will remain securely fastened during flight, even under sudden and severe stresses or vibration, and yet will permit of very rapid and easy release in an emergency. Most of those attempts have failed, the nature of the fastenings used being such that they become jammed under load, or require such force or such special manipulation to release them as to become a danger to the aviator in an emergency when he is apt to be in a flurried state of mind.

The object of the present invention is to provide a belt which will meet the required conditions.

While the invention is particularly applicable to safety belts for aviators it may be applied to belts for other purposes where security and quick and easy release are required.

Briefly stated the invention consists in a fastener which comprises inter-engaging members, one in the form of jaws between which the other, or others, is or are inserted and held, and a locking device for holding the jawed member closed, the arrangement being such that when the jawed member is unlocked it will be opened automatically, under the load or stress applied to the belt, so as to release the other member or members.

The invention also comprises a locking device which is so arranged that it will only necessitate a simple movement up to a position determined by a stop, so that the aviator with the use of one hand, and with the slightest mental effort, can effect his instant release even under the most trying conditions.

Figure 1:
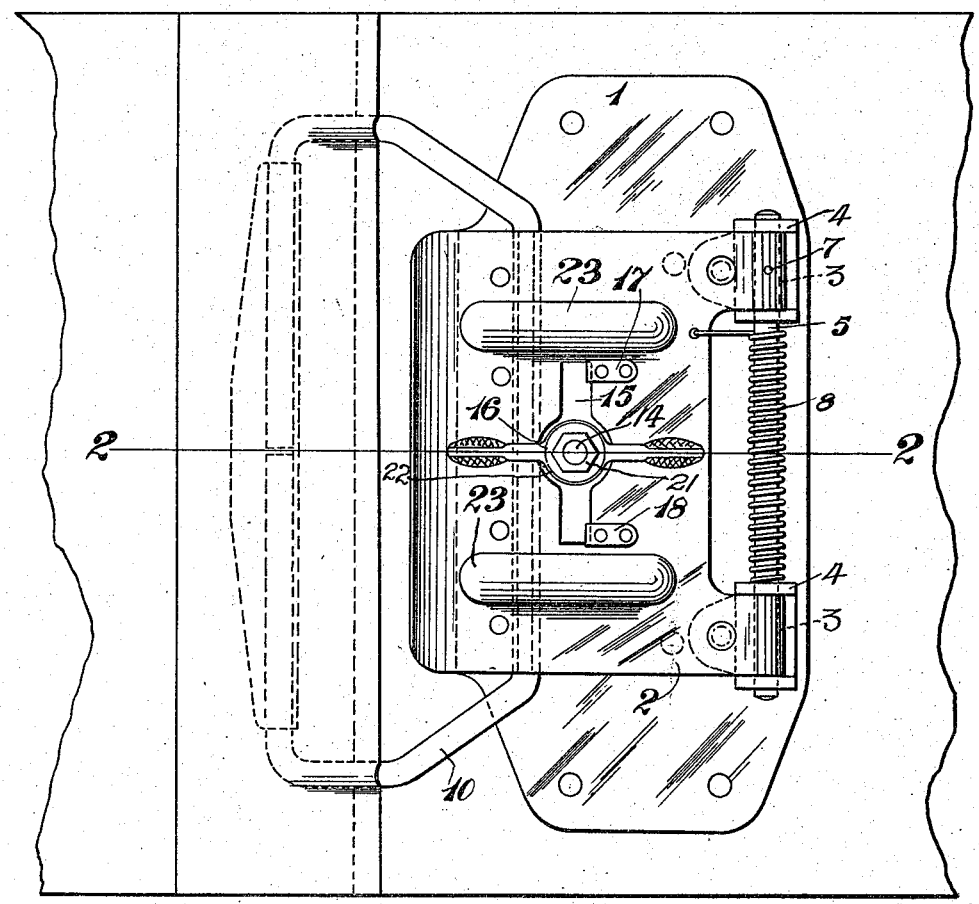

In the accompanying drawings,

Figure 1 is a front view of one form of fastener suitable for a single belt.

Figure 2:
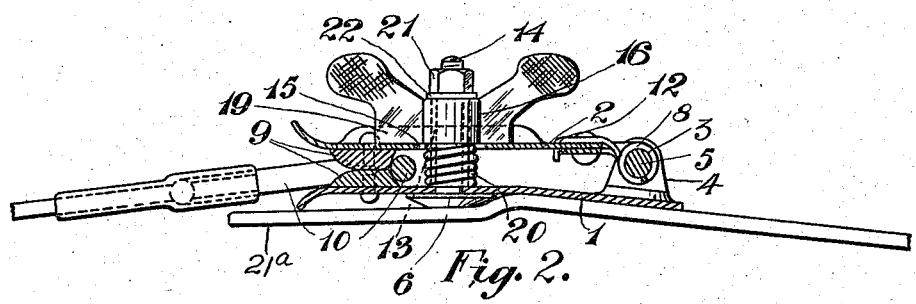

Fig. 2 being a sectional view on the line 2—2, Fig. 1.

Fig. 3 is a front view of another form of fastener suitable for a belt of the known type having a number of straps for passing diagonally across the body of the wearer.

Figs. 4 and 5 are sectional views on the lines 4—4 and 5—5 Fig. 3.

In carrying out the invention according to one form and as illustrated by Figs. 1 and 2, the jawed member of the fastener comprises two plates 1, 2, which are hinged together at one edge. They may be made of cast metal, but are preferably stamped out of sheet metal and formed with eyes 3 to receive a hinge pin 5. The pin 5 is carried by lugs 4 on the plate 1 which is riveted or otherwise secured to one end 6 of the belt. The pin 5 is held in position by a cross pin 7.

Each plate 1, 2, of the jawed member is provided with a ridge 9 on the inner face along the edge remote from the hinge pin. The ridges may be formed on the plates or may be strips of metal riveted or otherwise secured thereto. When the plates 1, 2, or jaws are closed the ridges 9 rest flat against each other.

A pin or hasp 10 carried by the other end 11 of the belt is adapted to be inserted between the jaws so that it rests behind the ridges 9 while the jaws are closed and the belt remains fastened, but when the jaws are opened the pin 10 or hasp is free to move out.

A spring 8 coiled about the pin 5 and having one end 12 engaged with the plate 2 tends to hold the jaws closed. In order to lock the jaws in the closed position, a suitable locking device is provided. In one form this comprises a bolt 14 the head of which is fixed on one plate 1 while its stem passes through a slot 15 in the other plate 2 and is fitted with a nut 21 and washer 22. A catch, for example, a head 16 resembling a wing nut revoluble on a sleeve 13 is adapted to be turned from one position to another so that it either overlaps the adjacent plate 2, or coincides with the slot 15 therein, to lock the plates 1, 2, together or to allow them to be opened, respectively. The catch 16 of the form shown facilitates operation by one hand. In order that the user need not be troubled to determine the unlocking position, it is preferred to provide stops 17, 18, on the plate 2, so that when the catch is in the locking position at right angles to the slot 15 and it is desired to move it into the unlocking position, all that is necessary is to turn it in either a clockwise or anti-clockwise direction until it is arrested by a projection 19 on the catch engaging with either of the stops 17 or 18. This will prevent the catch being moved past the open position should it be turned suddenly in case of emergency.

A helical spring 20 may be fitted to exercise friction between the bolt head and catch to prevent the catch turning as a result of the effect of vibration.

The plate 2 is provided with corrugations 23 to stiffen it.

In order to effect automatic opening of the jaws when unlocked, the ridges 9 on the plates 1, 2, are, in one form and as shown, provided with inclined faces so that between them they form a V shaped recess in which the pin or hasp 10 rests. When the jawed member is unlocked these surfaces act as cams so that when the load on the belt draws the pin 10 against them the hinged plates are forced open automatically and free the pin or hasp.

The end 6 of the belt is extended to form a flap 21ᵃ to protect the wearer's clothes from contact with the head of the bolt 14, rivets or the like projections.

In carrying out the invention according to another form as illustrated by Figs. 3 to 5, in the application to a belt of the known type having diagonally arranged bands adapted to meet over the chest of the wearer, where they are secured by a single fastener, the jawed member is carried by one band 6 while the other bands 11 are each provided with a ring or eye 10 which replaces the pin 10 of the form above described with reference to Figs. 1 and 2. Similarly, circular plates or rings 9 riveted to the plates 1 and 2 replace the ridges 9 of the other form. Otherwise all similar numerals indicate corresponding parts of the two forms shown, and the action is similar in both cases.

I claim:—

1. A fastener for a safety belt for aviators and others, comprising two interengaging members adapted to disengage under the stress of the belt, a rotary locking device for holding said members in engagement and adapted, when rotated into a predetermined position, to release said members, and means for arresting said rotary locking device in said predetermined position when rotated in either a clockwise or anticlockwise direction, substantially as and for the purpose hereinbefore set forth.

2. A fastener for a safety belt for aviators and others, comprising a hinged jawed member, a hasp member for engagement therewith, and a locking device for holding said jawed member closed, said jawed member being adapted to open under the stress applied to the belt, when released by said locking device, substantially as and for the purpose hereinbefore set forth.

3. A fastener for a safety belt for aviators and others, comprising a hinged jawed member having jaws provided with ridges having inclined inner faces, a hasp member adapted to be inserted within the jawed member for retention by said ridges, a locking device for holding the jawed member closed, said hasp being adapted to co-act with said inclined faces to open the jawed member under the stress of the belt when the jawed member is released by said locking device, substantially as and for the purpose hereinbefore set forth.

4. A fastener for a safety belt for aviators and others, comprising a hinged jawed member having jaws provided with ridges having inclined inner faces, a hasp member adapted to be inserted within the jawed member for retention by said ridges, a rotary locking device for holding the jawed member closed, said hasp being adapted to co-act with said inclined faces to open the jawed member under the stress of the belt when the jawed member is released by said locking device, and means for arresting the locking device in its position of release when rotated in either a clockwise or anticlockwise direction, substantially as and for the purpose hereinbefore set forth.

5. A fastener for a safety belt for aviators and others, comprising a hinged jawed member, a closing spring for holding said member closed, a hasp member for engagement with said jawed member, and a locking device for holding said jawed member closed, said jawed member being adapted to open under the stress applied to the belt when released by said locking device, substantially as and for the purpose hereinbefore described.

6. A fastener for a safety belt for aviators and others, comprising a jawed member consisting of two plates hinged together and provided with ridges having inclined inner faces, a hasp member adapted to be inserted between said plates behind the inclined faces on said ridges, a rotary locking device carried by one of said plates, the other of said plates having a slot to permit said locking device to pass therethrough when in a position coincident therewith, and stops on said slotted plate to arrest the locking device in said coincident position, when rotated in either a clockwise or anticlockwise direction for the purpose of permitting the hasp in engagement with the inclined faces of said ridges forcing the plates apart under the stress of the belt to effect an automatic release.

In testimony whereof I have signed my name to this specification in the presence of two subscribing witnesses.

MAURICE FRANCIS HUXLEY.

Witnesses:
G. J. BAUER,
SAM J. KING.